United States Patent [19]
Dooms

[11] Patent Number: 5,381,015
[45] Date of Patent: Jan. 10, 1995

[54] X-RAY INTENSIFYING SCREENS WITH AN IMPROVED SPEED/IMAGE QUALITY RELATIONSHIP

[75] Inventor: Philip Dooms, Edegem, Belgium

[73] Assignee: AGFA-Gevaert, N.V., Mortsel, Belgium

[21] Appl. No.: 118,740

[22] Filed: Sep. 10, 1993

[30] Foreign Application Priority Data

Sep. 11, 1992 [EP] European Pat. Off. ......... 92202770.1

[51] Int. Cl.⁶ .............................................. G21K 4/00
[52] U.S. Cl. .............................. 290/483.1; 250/486.1; 250/487.1
[58] Field of Search ............... 250/483.1, 484.4, 486.1, 250/487.1

[56] References Cited

U.S. PATENT DOCUMENTS 4,076,897 2/1978 Joiner, Jr. ..................... 250/483.1

FOREIGN PATENT DOCUMENTS 0178592 4/1986 European Pat. Off. ......... 250/483.1
2110199 5/1987 Japan ................................ 250/483.1

Primary Examiner—Paul M. Dzierzynski
Assistant Examiner—Richard Hanig
Attorney, Agent, or Firm—Breiner & Breiner

[57] ABSTRACT

X-ray intensifying screens of different speed classes are disclosed, showing a synergistic effect between screen speed or sensitivity and image quality, especially sharpness, if for each speed class the right combination is applied for the amount of dye in the screens and the weight amount and weight coverage of selected mixtures of yttrium tantalate or niobate phosphor and rare earth activated alkaline earth metal fluorohalide phosphors coated onto selected supports showing well-determined reflectance characteristics.

12 Claims, 3 Drawing Sheets

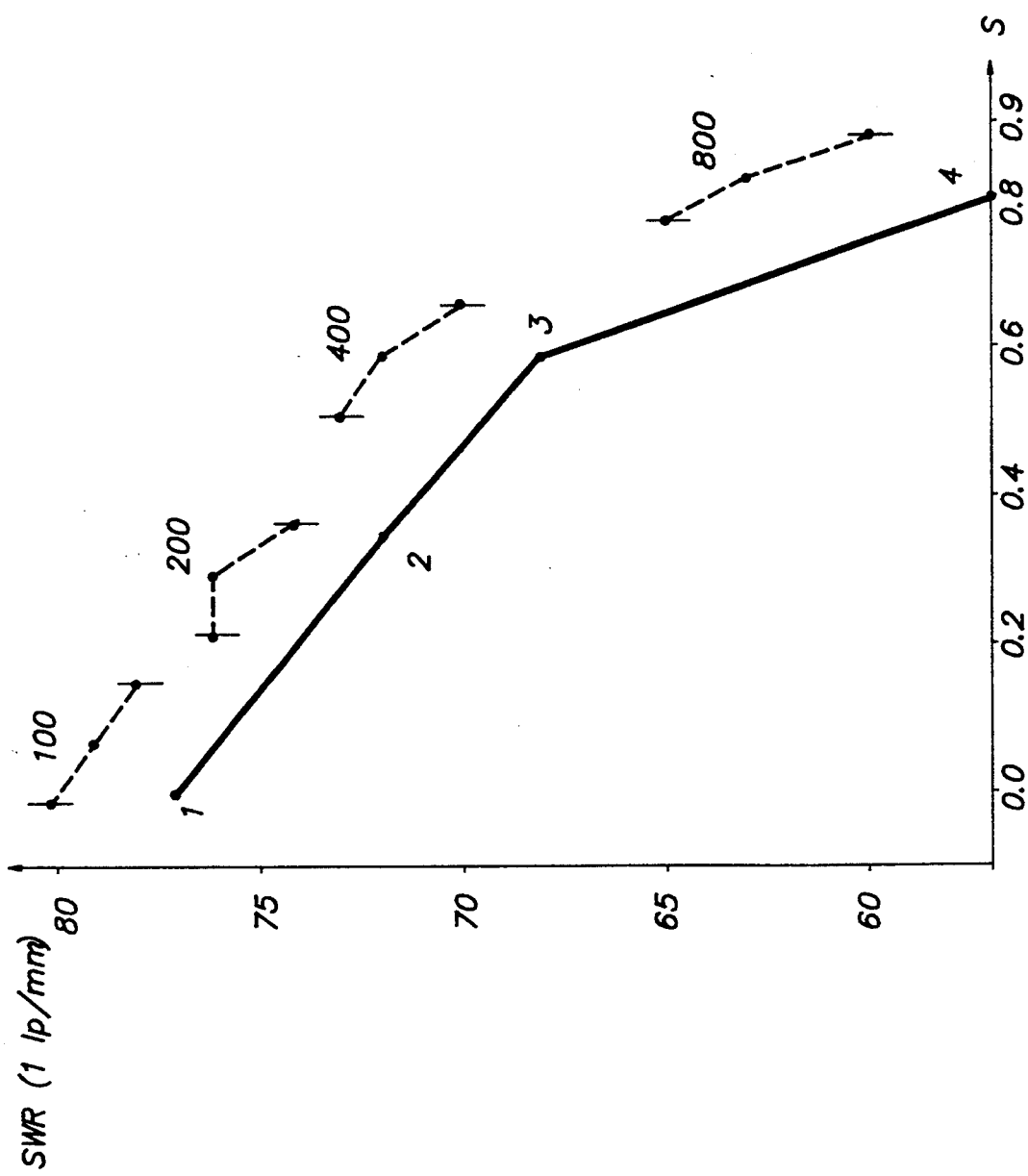

X-RAY INTENSIFYING SCREENS WITH AN IMPROVED SPEED/IMAGE QUALITY RELATIONSHIP

FIELD OF THE INVENTION

The present invention relates to an X-ray phosphor composition and X-ray intensifying screen containing same.

BACKGROUND OF THE INVENTION

In radiography the interior of objects is reproduced by means of penetrating radiation, which is high energy radiation belonging to the class of X-rays, y-rays and high-energy elementary particle radiation, e.g. $\beta$-rays, electron beam or neutron radiation. For the conversion of penetrating radiation into visible light and/or ultraviolet radiation luminescent substances, called phosphors, are used.

In a conventional radiographic system an X-ray radiograph is obtained by x-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support double-side coated with a silver halide emulsion layer. During the X-ray irradiation said film is arranged in a cassette between two X-ray conversion screens each of them making contact with its corresponding silver halide emulsion layer.

To improve image definition single-side coated silver halide emulsion films are exposed in contact with only one screen and are applied in e.g. mammography, autoradiography and in particular fields of non-destructive testing (NDT) known as industrial radiography. An autoradiograph is a photographic record formed through the intermediary of penetrating radiation emitted by radioactive material contained in an object, e.g. microtome cut for biochemical research.

Phosphors suited for use in the conventional radiographic system must have a high prompt emission of fluorescent light on X-ray irradiation and low afterglow in favor of image sharpness. The relationship between resolution and speed of X-ray intensifying screens is described e.g. in Med. Phys. 5(3), 205 (1978).

Well-known phosphors for use in intensifying screens are tantalate phosphors of the monoclinic M' structure as claimed in EP-Specification 011 909 B1 and more recently in U.S. Pat. No. 5,064,729 from Du Pont, wherein an improved phosphor efficiency and purity of said tantalate phosphors is achieved by reducing the level of contaminants in the phosphor reaction mixture. The preparation of rare earth tantalate and niobate phosphors showing low afterglow by mixing a diacid metal and an alkali to the basic materials has been disclosed by Nichia Kagaku in EP-Specification 202 875 and U.S. Pat. No. 4,959,174.

Other interesting phosphors for use in intensifying screens are rare earth activated alkaline earth fluorohalide phosphors as has been patented by Philips in U.S. Pat. No. 4,157,981 and 4,075,495.

Recently the use and preparation of a phosphor mixture of a divalent barium fluorobromide and a niobium doped yttriumtantalate for X-ray intensifying screens has been disclosed in U.S. Pat. No. 5,077,145. Advantages mentioned are the production of less cross-over light, a better graininess and sharpness and a reduced exposure amount.

Although the phosphors could be mixed in a variety of ratios to obtain screens for the known speed classes as defined in ISO/DP9236 it has been experimented that in using such mixture of phosphors image quality reduces (especially sharpness) as sensitivity increases.

A problem encountered on manufacturing screens from a mixture of the above phosphors for the different speed classes is that a favourable relation between speed and sharpness obtained for screens belonging to one speed class cannot be realized for screens of another speed class. Especially the transition from a lower to a higher speed class leads to a loss in maximum obtainable properties, in particular high speed/sharpness relationship, and a declination of the so-called "technological axis", reflecting said relationship.

OBJECT OF THE INVENTION

Therefore it is an object of the present invention to provide X-ray intensifying screens containing a mixture of at least one yttriumtantalate or niobate phosphor and at least one rare earth activated alkaline earth fluorohalide phosphor which, when X-ray exposed in combination with photographic silver halide emulsion films, provide high image quality, especially sharpness, for each of the different speed classes.

Other objects and advantages of the present invention will become clear from the following description.

SUMMARY OF THE INVENTION

In accordance with the present invention an X-ray phosphor screen is provided comprising a support and a layer which comprises a mixture of phosphors essentially consisting of (1) a monoclinic M' structure yttrium tantalate, niobate or tantalateniobate phosphor, and
(2) a rare earth activated alkaline earth fluorohalide phosphor and which may comprise one or more dyes characterized in that the dyes (if any) have a maximum absorption in the wavelength region between 410 and 500 nm and an extinction at said wavelength of maximum absorption of at least twice that at any wavelength below 410 nm and that the amount of said dye(s), the ratio by weight of said phosphors characterising the phosphor mixture, the phosphor coverage, and the reflectance of the support are selected in such a way that a synergistic effect is obtained between screen speed and sharpness for each of said speed classes.

This means that the screens belong to one of the 4 classes given hereinafter. In these classes the percentage reflection of the support material given is measured with a PERKIN ELMER 555 spectrophotometer and is expressed as % reflectance over the wavelength range from 350 to 600 nm versus a polyethylene terephtalate support containing barium sulphate, taken as 100%. In these classes the amount of dye (if present) corresponds to that amount bringing about a loss in speed, expressed as relative logarithmic values, in a reference screen, the speed of which is determined as prescribed in ISO DP/9236. The said reference screen comprises a phosphor coating composition at a phosphor coverage of 60 mg/cm², prepared by intimately mixing the following components:

| | |
|---|---|
| -phosphor: $(Y_{0.999},Sr_{0.001})TaO_4:0.01Nb$ | 100 g |
| -binder composition: | 12 g |
| cellulose acetobutyrate (30% in 2-butanone): polyethyl acrylate (30% in ethyl acetate) 1/1 | |
| -solvent composition: | 40 g |
| ethyl acetate:methyl ethyl ketone 1/1 | |
| -dispersing agent GAFAC RM 610 | 0.5 g |
| trade name from GAF, New York, USA, for sorbitan monopalmitate and monolaurate, | | and coating said composition onto a subbed 200 μm thick polyethylene terephthalate support containing carbon black and having a reflectance of 0-10% as defined above whereupon said coating is dried.

Screens of class A comprise:

(1) dye(s) in an amount corresponding to that causing a speed loss (δs) with said reference screen in the range between 0.22 and 0.32 (relative Logarithmic values)

(2) a ratio by weight of phosphor(1) to phosphor(2) comprised between 99:1 and 95:5

(3) a phosphor coverage of 25 to 35 mg/cm² and (4) a support characterized by a degree of reflectance as defined hereinbefore of 0 to 10%. Screens of class B comprise:

(1) dye(s) in an amount corresponding to that causing a speed loss (δS) with said reference screen in the range between 0.16 and 0.26 (relative logarithmic values )

(2) a ratio by weight of phosphor(1) to phosphor(2) comprised between 90:10 and 80:20

(3) a phosphor coverage of 40 to 50 mg/cm² and (4) a support characterized by a degree of reflectance as defined hereinbefore of 85 to 100%.

Screens of class C comprise:

(1) dye(s) in an amount corresponding to that causing a speed loss (δS) with said reference screen in the range between 0.01 and 0.06 (relative logarithmic values)

(2) a ratio by weight of phosphor(1) to phosphor(2) comprised between 99:1 and 90:10

(3) a phosphor coverage of 53 to 65 mg/cm² and (4) a support characterized by a degree of reflectance as defined hereinbefore of 45 to 60%.

Screens of class D comprise:

(1) dye(s) in an amount corresponding to that causing a speed loss (δS) with said reference screen in the range between 0.00 and 0.03 (relative logarithmic values)

(2) a ratio by weight of phosphor(1) to phosphor(2) comprised between 65:35 and 35:65

(3) a phosphor coverage of 55 to 83 mg/cm² and (4) a support characterized by a degree of reflectance as defined hereinbefore of 0 to 10%.

BRIEF DESCRIPTION OF THE DRAWINGS

FIG. 3 represents a graph wherein the synergistic effect is illustrated that has been attained for each sensitivity class in the relation between image quality (sharpness) and screen speed making use of the 4 defined parameters (dye, weight ratio of phosphor (1) to phosphor (2), phosphor coverage and reflectance of the support) by making a plot of the square wave response (SWR) at 1 line pair per mm and the speed S in log Ixt-values. The full line represents the comparative situation for screens with different speed classes, manufactured by simply extrapolating one parameter leaving the others unchanged, as a consequence thereof, shows a lack in synergistic effects.

DETAILED DESCRIPTION OF THE INVENTION AND EXAMPLES

Figure 1:
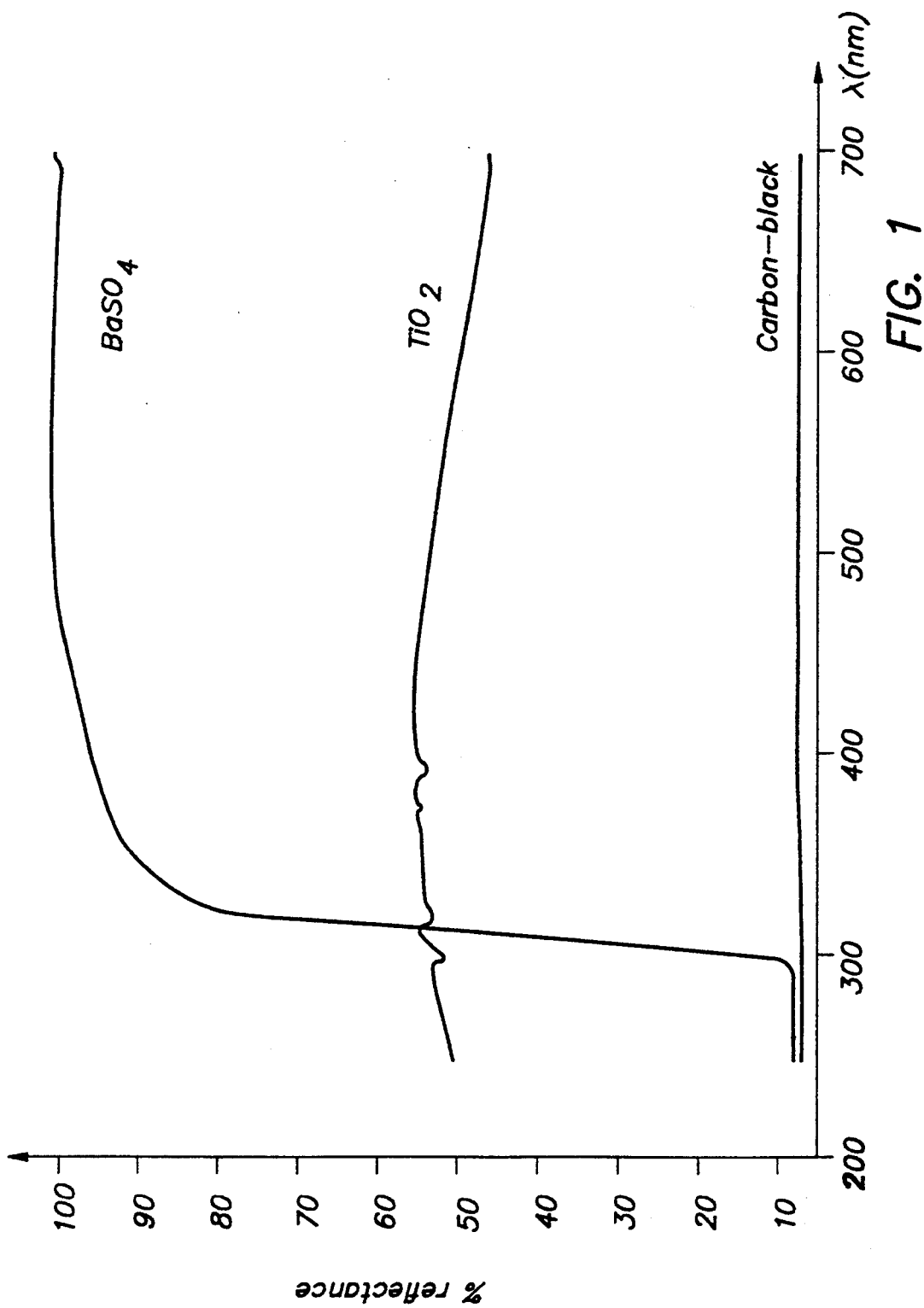
FIG. 1 represents a graph wherein the percentile reflectance is given as a function of the wavelength in nm for supports used for the different screens belonging to a different speed class.

The preparation of the yttriumtantalate or niobate phosphors (1) is described in published EP Specifications 202 875 and 011 909. The average grain size of said phosphors is preferably in the range of 2 to 25 μm, more preferably in the range of 2 to 9 μm.

The preparation of the rare earth activated alkaline earth metal fluorohalide phosphors (2) proceeds analogously to the preparation of barium fluorochloride phosphors described e.g. in GB-P 1,161,871 and 1,254,271 and in U.S. Pat. No. 4,088,894. The average grain size of phosphor (2) is preferably in the range of 2 to 25 μm, and more preferably in the range of 2 to 9 μm.

It is generally known that sharper images with less noise are obtained with phosphor particles of smaller mean particle size, but light emission efficiency declines with decreasing particle size. Thus, the optimum mean particle size for a given application is a compromise between imaging speed and image sharpness desired.

A preferred phosphor (1) is $(Y_{1-2/3)x}, Sr_x) TaO_4:nNb$ with $10^{-5} \leq x \leq 1$ or $0 \leq x \leq 1$ and $0 \leq n \leq 0.05$.

A preferred phosphor (2) is a europium activated barium fluorohalide phosphor, wherein the halide may be chloride or bromide, in particular BaFBr:$mEu^{2+(3+)}$, with $5.10^{-4} \leq m \leq 5.10^{-2}$. The preparation of said phosphor is carried out in such a way that at least part of the europium-activator is in the trivalent state. The phosphor has a high prompt emission on X-ray exposure but is not particularly suited for use as storage phosphor in computed radiography as described e.g. in Radiology 148, p. 833-838, September 1983.

Both phosphors (1) and (2) are emitting in the near UV and blue region of the visible spectrum, i.e. mainly in a wavelength range of 360 to 450 nm, and as such can be used in conjunction with a photographic silver halide emulsion film having inherent sensitivity in that spectrum range, e.g. a duplitized silver halide emulsion layer film of the type described in GB-P 1 477 637 which has to be read therefore in conjunction herewith.

X-ray screens of the present invention comprise phosphor (1) and phosphor (2) in a weight ratio range of
 95:5 to 99:1 for speed class A
 80:20 to 90:10 for speed class B
 90:10 to 99:1 for speed class C
 35:65 to 65:35 for speed class D
wherein the speed (sensitivity) is defined according to IS0/DP9236 and is related to the combination of a pair of screens with a double-side coated silver halide material. For each speed class a particular exposure dose, expressed in mGy$^{-1}$, is necessary to provide a density of 1.0 above fog on the film in contact with the screens manufactured according to this invention as will be illustrated hereinafter.

It has to be reminded that for the said different sensitivity or speed classes the corresponding screens not only differ in their weight ratio range for the phosphors as has been given hereinbefore but that simultaneously three other variable parameters have been changed to get the unexpected synergistic effect between speed and sharpness for each of said screen speed classes. Differences in granularity are thereby not disturbing or otherwise said signal-to-noise ratios are in accordance with the correspondingly measured speed/SWR-values.

The said three other variable parameters determining the presence of the said synergistic effect are the coated amount of phosphor, the presence of a colored dye in the said coated phosphor layer and the reflectance of the support on which the phosphor layer was coated.

As is well-known the thickness of the phosphor layer may differ depending on the amount of binding agent used. Usually said thickness is within the range of from 50 to 1000 μm, preferably from 50 to 500 micron and more preferably from 150 to 250 μm.

The coated amounts of phosphor(s) vary depending on the screen speed class. In accordance with this invention and corresponding to the weight ratio amounts of phosphor (1) and phosphor (2) mentioned hereinbefore for the different sensitivity classes, the following amounts of said phosphor mixtures, expressed in mg/cm$^2$ are coated:

25–35 for speed class A
40–50 for speed class B
53–65 for speed class C
55–83 for speed class D In accordance with this invention the coating dispersion may also contain a dye capable of absorbing light within the spectrum emitted by the phosphor to provide the synergistic effect between speed and sharpness for each speed class of the manufactured screens.

According to this invention the dyes are characterized by an absorption spectrum showing no substantial absorption for wavelengths situated below 410 nm and by a maximum absorption in the wavelength range between 410 and 500 nm. An extinction coefficient at the wavelength of maximum absorption of at least twice of that in the range below 410 nm is necessary to reduce the scattering of the emitted fluorescent light upon exposure to incident X-rays and to reduce cross-over phenomena in the film.

For each of the speed classes the dyes are used in amounts corresponding to the amounts causing a loss in sensitivity as defined hereinbefore in a reference screen.

Figure 2:
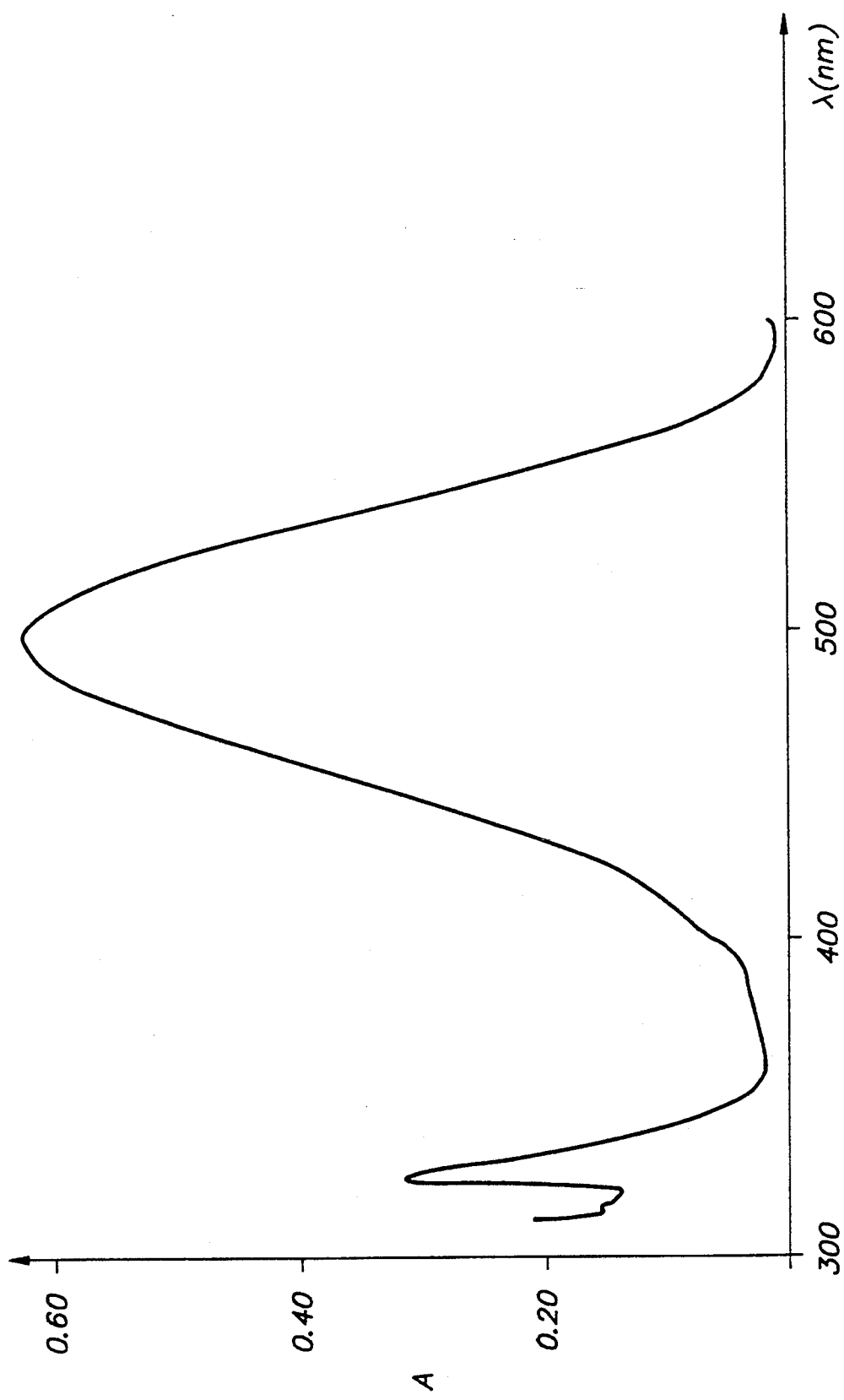
FIG. 2 represents a graph wherein the absorption spectrum as a function of the wavelength (in nm) is given for a preferred dye (MACROLEX ROT GS) used in the phosphor layer.

In accordance with this invention MACROLEX ROT GS, MACROLEX ROT EG and MACROLEX ROT E2G, which are all trademarked products from BAYER (Leverkusen, Germany), are preferred colored dyes. The absorption spectrum of MACROLEX ROT GS, measured from a 0.002% solution of the dye in methylethylketone as a solvent, is given in FIG. 2. The measurement was carried out with a PERKIN ELMER 555 spectrophotometer, registrated at a scan speed of 240 nm/min.

MAKROLEX ROT GS is preferred in the following variable amounts, expressed in weight % versus the coated phosphor, for the different speed classes, characterized by the corresponding phosphor mixtures and the coated amounts of phosphor(s), already given hereinbefore:

0.05–0.08 for speed class A
0.03–0.06 for speed class B
0.001–0.008 for speed class C
0–0.0005 for speed class D The cross-over (determined as % cross-over) in the film is determined as follows. Double side coated film samples are adjusted between a single light emitting screen and a white paper, replacing the second screen. This film-screen element, directed with its light emitting screen to the X-ray tube is then exposed with varying X-ray doses, expressed as log E and after processing these samples in the 90 seconds cycle, the minimal dose (log E) needed to obtain a density of 0.5 above fog is determined for the frontlayer (log E front) and the backlayer (log E back) separately. The cross-over percentage is then calculated according to the following equation:

$$\% \text{ cross-over} = 100/\text{antilog}(\text{logE back} - \text{logE front})$$

Coated in these amounts MACROLEX ROT GS gives rise to a loss in sensitivity versus the reference screen described hereinbefore corresponding to the given relative logarithmic values for each speed class. For the other dyes, e.g. for the preferred dyes like MACROLEX ROT EG and MACROLEX ROT E2G the loss in sensitivity for the different speed classes is exactly within the same limits but the amounts of dye that have to be coated into the screen composition are different, due to the differences in extinction coefficient between the preferred dyes.

As is well-known radiographic conversion screens for medical diagnosis purposes are coated onto a support. Examples of support materials include cardboard, plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. A plastic film is preferably employed as the support material.

Depending on the speed class of the screens for which a synergistic effect has to be attained in the relation between speed and sharpness, the following supports, characterized by their reflectance properties, expressed as % reflectance over the wavelength range from 350 to 600 nm, are used:

0–10% for speed classes A and D
45–60% for speed class C
85–100% for speed class B The percentage reflection for each of the support materials was measured with a spectrophotometer from the type PERKIN ELMER 555. Barium sulphate was taken as a reference point with a percentage reflectance of 100% within the wavelength region between 350 and 600 nm.

A preferred support used in accordance with this invention is polyethylene terephthalate. Within the percentage reflectance values cited the following pigment containing polyethylene terephthalate supports are particularly preferred:

a terephtalate support containing carbon black as light-absorbing material for speed classes A and D a terephtalate support containing titanium dioxide(anatase) as light-reflecting material for speed class C a terephtalate support containing barium sulphate as light-reflecting material for speed class B FIG. 1 represents a graph wherein the percentage reflectance is given, as a function of the wavelength in nm for the pigment containing supports just mentioned.

It is clear that within the scope of this invention the data selected for the support should be combined with the data given hereinbefore for the weight ratio of the phosphor mixture, the amount of phosphor coated and the amount and absorption characteristic of the dye in the phosphor layer for each of said speed classes, the data of which are summarized in Table I. In this table, "class" represents the speed class to which the screen belongs (A-D) and "dose$^{-1}$", given in mGy$^{-1}$, represents for all classes the inverse value region of the exposure dose, necessary to obtain with a pair of these screens of this class and a the double-sided radiographic film a density d=1.00 above fog, after processing. The variable parameters mentioned are:

"$\delta S$", expresses the speed loss ($\delta S$ in relative logarithmic values) as defined hereinbefore, due to the presence of a dye or dyes in the screen "support" determines the percentage of reflectance as defined hereinbefore "%fluorohalide" represents the weight % for the amount of alkaline earth fluorohalide phosphor in the phosphor mixture.

"phosphor coverage" represents the amount in mg/cm$^2$ of the phosphors coated in the phosphor layer.

TABLE I

| class | dose$^{-1}$ | $\delta S$ | support | % fluorohalide phosphor | phosphor coverage |
|-------|-------------|------------|---------|-------------------------|-------------------|
| A | 38–68 | 0.22–0.32 | 0–10 | 1–5 | 25–35 |
| B | 100–141 | 0.16–0.26 | 85–100 | 10–20 | 40–50 |
| C | 170–245 | 0.01–0.06 | 45–60 | 1–10 | 53–65 |
| D | 330–480 | 0.00–0.03 | 0–10 | 35–65 | 55–83 |

X-ray conversion screens in accordance with the present invention generally comprise in order : a support (also called substrate), at least one layer comprising phosphor particles dispersed in a suitable binder and a protective coating coated over the phosphor containing layer to protect said layer during use. Further, a primer layer is sometimes provided between the phosphor containing layer and the substrate to closely bond said layer thereto.

In most applications the phosphor layers contain sufficient binder to give structural coherence to the layer. In view of a possible phosphor recovery from worn-out screens the binder of the phosphor containing layer is preferably soluble and remains soluble after coating.

Useful binders, a non-limitative survey of which is given herein, include proteinaceous binders, e.g. gelatin, polysaccharides such as dextran, gum arabic, and synthetic polymers such as polyvinyl butyral, polyvinyl acetate, nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. Nos. 2,502,529, 2,887,379, 3,617,285, 3,300,310, 3,300,311 and 3,743,833.

A mixture of two or more of these binders may be used, e.g., a mixture of polyethyl acrylate and cellulose acetobutyrate.

The weight ratio of phosphor to binder is generally within the range of from 50:50 to 89:11, preferably from 80:20 to 89:11.

The screen according to the present invention may comprise a supported layer of phosphor particles dispersed in a binding medium comprising one or more rubbery and/or elastomeric polymers as described in PC-Application/EP 93/01551 and 93/01552, filed on Jun. 17, 1993. In this way a ratio by weight of pigment to binding medium of more than 90:10 and more preferably of at least 95:5, e.g. 98:2 can be obtained providing besides an excellent image resolution a high ease of manipulation as a result of a good elasticity of the screen and good adhesion properties between the support and the phosphor layer. Problems concerning staining of screens comprising said rubbery binder(s) may be overcome by the addition of known rubber anti-oxidation compounds like IRGANOX 1010 and IRGASTAB T36 (trademarked products of CIBA-GEIGY, Basel, Switzerland), ANTIOXIDANT 330 (trademarked product of ETHYL CORP.,Richmond, USA), VANOX 2246 (trademarked product of VANDERBILT ENERGY CORP., Denver, Canada) etc, this list being non-limitative.

The phosphor layer can be applied to the support by employing a method such as vapor deposition, sputtering and spraying but is usually applied by the following procedure.

Phosphor particles and a binder are added to an appropriate solvent as described hereinafter, and are then mixed to prepare a coating dispersion comprising the phosphor particles homogeneously dispersed in the binder solution. Said coating dispersion may further comprise a dispersing agent and plasticizer and filler material as described hereinafter.

The coating dispersion containing the phosphor particles and the binder is applied uniformly onto the surface of the support to form a layer of the coating dispersion. The coating procedure may proceed according to any conventional method such as doctor blade coating, dip-coating or roll coating.

For the preparation of highly abrasion resistant and chemically resistant phosphor-binder layers the binder is cured. Curing of the binder may proceed photochemically by means of UV radiation or with electron beam (EB) as described e.g. in Research Disclosure December 1977, item 16435 or proceeds purely chemically as described e.g. in U.S. Pat. No. 4,508,636. It may also be cured by moisture as described in EP-Application 541 146 A1. Curing may also be performed by heating.

In the preparation of the phosphor screen having a primer layer between the substrate and the fluorescent layer, the primer layer is provided on the substrate beforehand, and then the phosphor dispersion is applied to the primer layer and dried to form the fluorescent layer.

After applying the coating dispersion onto the support, the coating dispersion is then heated slowly to dryness so as to complete the formation of a phosphor layer.

In order to remove as much as possible entrapped air in the phosphor coating composition it can be subjected to an ultra-sonic treatment before coating. The phosphor-binder layer (as described e.g. in U.S. Pat. No. 4,059,768) can be calendered to improve the phosphor packing density in the dried layer.

Useful solvents for the binder of the phosphor containing layer, employable in the preparation of the phosphor coating dispersion include lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned solvents.

Useful dispersing agents for the phosphor particles in the coating dispersion to improve the dispersibility of the phosphor particles therein, may contain a variety of additives such as a plasticizer for increasing the bonding between the binder and the phosphor particles in the phosphor layer. Examples of the dispersing agent include ionic and nonionic well-known dispersing agents or combinations thereof, e.g., GAFAC RM 610 (tradename) a polyoxyethylene (20) sorbitan monopalmitate and monolaurate marketed by General Aniline and Film Company (GAF), New York, USA, polymeric surfactants such as the acrylic graft copolymer, PHOSPHOLIPON 90 (tradename) marketed by Nattermann-Phospholipid GmbH, Kön, W. Germany, silane dispersing agents and surfactants e.g. DOW CORNING 190 (tradename) and SILANE Z6040 (tradename) marketed by Dow Corning Corporation, Midland, Michigan, USA or glymo 3-glycidyloxypropylmethoxysilane or organosulfate polysilanes, unsaturated p-aminamide salts and high molecular acid esters such as ANTI TERRA U 80 (tradename) marketed by BYK-Chemie GmbH, Wesel, W. Germany, high molecular unsaturated polyesters, etc. Dispersing agents are added in an amount of 0.05 to 10% by weight based on the phosphor.

Useful plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plasticizers, e.g. and polyesters of polyethylene glycols with aliphatic dicarboxylic acids such as polyester of triethylene glycol with adipic acid and polyester of diethylene glycol with succinic acid.

After the formation of the fluorescent layer, a protective layer is generally provided on top of the fluorescent layer.

In a preferred embodiment the protective coating has a layer thickness d comprised between 1 and 50 μm and an embossed surface roughness is applied for high ease of manipulation, thereby avoiding sticking, friction and electrostatic attraction with maintenance of an excellent image resolution.

The embossed protective layer can be provided on the phosphor layer in order to protect it against mechanical and chemical damage by the steps of (1) coating onto said phosphor containing layer a liquid radiation-curable composition having at the coating temperature a viscosity of at least 450 mPa.s, measured with a Hoeppler viscometer, that does not penetrate for a substantial degree into the phosphor containing layer, (2) providing an embossed structure to the coating, and (3) curing said coating by radiation.

For more details concerning preferred protective coatings with embossed surface there is referred to EP-Applications 510 753 A1 and 510 754 A1.

In common medical radiography the screens are fixed inside a cassette allowing the arrangement of a double-side coated silver halide emulsion film in between. In the radiographic exposure step one side of the silver halide material is exposed by the fluorescent light of a front screen (the screen most close to the X-ray source) and the other side is exposed by the fluorescent light emitted by the back screen which is the screen struck by the X-rays that have penetrated already the photographic material.

Front and back screen are generally symmetrical but they may be asymmetrical e.g. screens of different classes as defined hereinbefore may be used. The same applies to the photographic material, the silver halide emulsions on both sides are generally of the same composition but they may be different and sensitometrically adapted to the corresponding screen.

In a particular embodiment of the present invention the screens are used in combination with a radiographic film material that is provided at both sides of the film support with a silver halide emulsion layer and an antistress layer as a protective layer coated thereover. The radiographic material preferably has on each side of the film support silver halide emulsion coatings that are split into two distinctive emulsion layers having silver halide crystals of different average grain size one of which is a high speed emulsion layer and the other is a low speed emulsion layer; the high speed emulsion layer being situated at a larger distance from the support than the low speed emulsion layer. This way the sensitometric curve can be fine-tuned, giving the perfect profile for the specific application.

Moreover even without using a separate anti crossover layer this layer arrangement reduces crossover, especially in the critical low density area.

In the presence of crossover preventing antihalation undercoat layers containing selected filter dyes the crossover reduction is improved without leaving a color stain upon processing, especially upon rapid processing in less than 60 seconds, preferably in 38 seconds as a reference processing time of materials with high-throughput.

All combinations of symmetrically double side coated films with a symmetric or asymmetric set of intensifying screens manufactured according to this invention or combinations of double side coated films with asymmetric emulsion layers, whether or not duplitized, in combination with a symmetric or asymmetric set of intensifying screens manufactured in accordance with this invention can be useful, depending on the specific needs required, provided that for the different speed classes the proposed ranges of the variable parameters for the screens are respected.

With the present phosphor screens an improvement in the speed:image-sharpness relationship can thus be realized.

In Table II and FIG. 3 the favourable relationship of speed:image-sharpness is illustrated for a number of screens according to the present invention.

The screens No. 1 to No. 8 were prepared in the following way.

The phosphor coating compositions were prepared by intimately mixing the following components:

| | |
|---|---|
| BaFBr:0.01Eu$^{2+(3+)}$ | P g |
| (Y$_{0.999}$,Sr$_{0.001}$)TaO$_4$:0.01Nb | Q g |
| cellulose acetobutyrate (30% in 2-butanone) | 13.33 g |
| polyethyl acrylate (30% in ethyl acetate) | 42.2 g |
| ethyl acetate | 9.75 g |
| methyl glycol | 19.3 g |
| 2-butanone | 9.75 g |
| dispersing agent GAFAC RM 610 (tradename) | 0.4 g |
| MACROLEX ROT GS | R g |

Screens No. 1 to No. 8 were made containing respectively the following ratios by weight of europium doped bariumfluorobromide to said tantalate phosphor of 1:99 and 5:95 for No. 1 and No. 2; of 20:80 and 10:90 for No. 3 and No. 4; of 1:99 and 10:90 for No. 5 and No. 6 and of 50:50 for No. 7 and No. 8 with P+Q=200 g.

Corresponding amounts of the dye MACROLEX ROT GS for the screens No. 1 to 8 were respectively 0.16, 0.10, 0.12, 0.06, 0.16, 0.002, 0 and 0.001 g.

Said compositions were doctor blade coated onto a subbed 200 micron thick pigmented polyethylene terephthalate supports (carbon black for Nos. 1, 2, 7 and 8; barium sulphate for Nos. 3 and 4 and titanium dioxide for Nos. 5 and 6) at a phosphor coverage of resp. 25, 35, 40, 50, 60, 65, 60 and 80 mg/cm$^2$ and dried.

By roll coater onto the dried phosphor-containing layer a cellulose acetobutyrate layer having a dry thickness of 10 micron was applied as protective layer.

Pairs of screens of the same composition were arranged in the same type of cassette and between the screens and in contact therewith a same double-side coated silver halide emulsion coated film was inserted.

In manufacturing the film a silver bromoiodide emulsion (2 mole % of silver iodide) was used containing silver halide grains with an average grain size of 1.25 μm. The emulsion ready for coating contained per kg an amount of silver halide corresponding to 190 g of silver nitrate and 74 g of gelatin. As stabilizing agents the silver halide emulsion contained per kg 545 mg of 5-methyl-7-hydroxy-s-triazolo[1,5-a]pyrimidine and 6.5 mg of 1-phenyl-5-mercaptotetrazole.

The above emulsion was coated on both sides of a double side subbed polyethylene terephthalate support. To each of the dried silver halide emulsion layers a protective layer was applied containing 1.1 g/m$^2$ of gelatin, hardened with formaldehyde and containing perfluorocaprylic acid as antistatic agent. The hardening proceeded by adding 0.03 grams of formaldehyde per gram of gelatin. Each silver halide emulsion layer contained an amount of silver halide equivalent with 7 g of silver nitrate per m$^2$.

The X-ray exposure proceeded with different doses, given in mGy, the relative logarithmic value of the inverse value of said dose being represented in Table II. As a reference point the dose given to screen No. 1 was taken as 1.0. This explains why the log value of the inverse dose leads to a value of 0 for S in the table for the corresponding screen No. 1. The X-ray exposure proceeded according to ISO/DP9236 with 77 median kVp X-rays for chest exposure.

The processing of the exposed silver halide emulsion materials, exposed between the corresponding pairs of screens No. 1 to No. 8 proceeded with the following developing liquid, followed by fixing and rinsing at the indicated temperature and processing time.

| Composition of the developing liquid (pH: 10.1) - (35° C., 27 s). | |
|---|---|
| Hydroquinone | 30 g/l |
| Potassium sulphite | 64 g/l |
| 1-Phenyl-3-pyrazolidinone | 1.5 g/l |
| Potassium bromide | 4 g/l |
| Glutardialdehyde | 4.7 g/l |
| The pH was adjusted at 10.1 with bicarbonate/carbonate buffer. | |
| Composition of the fixing liquid (pH: 4.3) - (34° C., 18 s). | |
| Ammonium thiosulphate | 132 g/l |
| Sodium sulphite | 10.8 g/l |
| Aluminium sulphate | 5.4 g/l |

The pH was adjusted at 4.3 with acetic acid/acetate buffer.

The rinsing proceeded with tap water at a temperature of 27° C. for a duration of 28 s.

After processing the SWR values used in connection with Table II and FIG. 3 were determined at 1 line pair per mm (SWR1). The determination of the SWR value for intensifying screens proceeded as described in DIN 6867, 2nd draft 1988 said intensifying screens being coated with a phosphor mixture of BaFBr:0.01Eu$^{2+(3+)}$ and (Y$_{0.999}$, Sr$_{0.001}$)TaO$_4$:0.01Nb

TABLE II

| No. | S | dye | support | % BaFBr:mEu$_{2+(3+)}$ | coated amount | SWR1 |
|---|---|---|---|---|---|---|
| 1 | 0.00 | 0.08 | carbon black | 1 | 25 | 80 |
| 2 | 0.15 | 0.05 | carbon black | 5 | 35 | 78 |
| 3 | 0.22 | 0.06 | bariumsulphate | 20 | 40 | 76 |
| 4 | 0.37 | 0.03 | bariumsulphate | 10 | 50 | 73 |
| 5 | 0.52 | 0.08 | titaniumdioxide | 1 | 60 | 72 |
| 6 | 0.67 | 0.001 | titaniumdioxide | 10 | 65 | 70 |
| 7 | 0.78 | 0.00 | carbon black | 50 | 60 | 65 |
| 8 | 0.90 | 0.0005 | carbon black | 50 | 80 | 60 |

The curve in FIG. 3 obtained from the values in Table II illustrates that in accordance with the present invention for all speed classes a synergistic effect can be realized in the relation between speed and sharpness versus the state-of-the-art, the declination of the "technological axis" being reduced considerably if compared with screens of different speed classes manufactured by simply extrapolating one parameter, leaving the others unchanged and not applying the preferred phosphor mixture of yttriumtantalates and bariumfluorohalides in variable amounts.

I claim:

1. An X-ray intensifying phosphor screen comprising a support and layer which comprises a mixture of phosphors essentially consisting of
   (1) a monoclinic M' structure yttrium tantalate, niobate or tantalateniobate phosphor, and
   (2) a rare earth activated alkaline earth fluorohalide phosphor and which may comprise one or more dyes characterized in that the dyes (if any) have a maximum absorption in the wavelength region between 410 and 500 nm and an extinction coefficient at said wavelength of maximum absorption of at least twice that at any wavelength below 410 nm and that the amount of said dye, the ratio by weight of said phosphors characterising the phosphor mixture, the phosphor coverage, and the reflectance of the support are selected in such a way that the screens belong to one of the 4 classes given hereinafter wherein the amount of dye (if any) is expressed as that causing a determined loss in speed in a reference screen as defined herein and wherein the percentage reflection for each of the selected support materials is determined as defined herein;

class A comprising
(1) dye(s) in an amount causing a loss in speed in the range between 0.22 and 0.32 (relative logarithmic values)
(2) a ratio by weight of phosphor (1) to phosphor (2) comprised between 99:1 and 95:5
(3) a phosphor coverage of 25 to 35 mg/cm$^2$ and (4) a support having a degree of reflectance between 0 and 10%;

class B comprising
(1) dye(s) in an amount causing a loss in speed in the range between 0.16 and 0.26 (relative logarithmic values)
(2) a ratio by weight of phosphor (1) to phosphor (2) comprised between 90:10 and 80:20
(3) a phosphor coverage of 40 to 50 mg/cm$^2$ and (4) a support having a degree of reflectance between 85 and 100%;

class C comprising
(1) a dye(s) in an amount causing a loss in speed in the range between 0.01 and 0.06 (relative logarithmic values)
(2) a ratio by weight of phosphor (1) to phosphor (2) comprised between 99:1 and 90:10
(3) a phosphor coverage of 53 to 65 mg/cm$^2$ and (4) a support having a degree of reflectance between 45 and 60%;

class D comprising
(1) dye(s) in an amount causing a loss in speed in the range between 0.00 and 0.03 (relative logarithmic values)
(2) a ratio by weight of phosphor (1) to phosphor (2) comprised between 65:35 and 35:65
(3) a phosphor coverage of 55 to 83 mg/cm$^2$ and (4) a support having a degree of reflectance between 0 and 10%;

2. An X-ray intensifying phosphor screen according to claim 1, wherein said colored dye is at least one of MACROLEX ROT GS, MACROLEX ROT EG and MACROLEX ROT E2G.

3. An X-ray intensifying phosphor screen according to claim 2, wherein MAKROLEX ROT GS is present in an amount of 0.05 to 0.08 mg/m$^2$ for class A, 0.03 to 0.06 mg/m$^2$ for class B, 0.001 to 0.008 mg/m$^2$ for class C and 0 to 0.0005 mg/m$^2$ for class D.

4. An X-ray intensifying phosphor screen according to claim 1, wherein said monoclinic M' structure yttrium tantalate, niobate or tantalateniobate phosphor is $(y_{1-(2/3)x},Sr_x)TaO_4:nNb$, with $10^{-5} \leq x \leq 1$ and $0 \leq n \leq 0.05$ or is $YTaO_4:nNb$ and wherein said rare earth activated alkaline earth fluorohalide phosphor is $BaFBr:mEu^{2+(3+)}$, with $5.10^{-4} \leq m \leq 5.10^{-2}$.

5. An X-ray intensifying phosphor screen according to claim 1, wherein the average grain size of the yttrium tantalate or niobate phosphor and of the rare earth activated alkaline earth metal phosphor is in the range of 2 to 25 μm.

6. An X-ray intensifying phosphor screen according to claim 1, wherein the average grain size of the yttrium tantalate or niobate phosphor and of the rare earth activated alkaline earth metal phosphor is in the range of 2 to 9 μm.

7. An X-ray intensifying phosphor screen according to claim 1, wherein said support is a polyethylene terephthalate support containing carbon black for classes A and D, barium sulphate for class B and titanium dioxide for class C.

8. An X-ray intensifying screen according to claim 1, wherein the phosphor layer has a thickness between 150 and 250 μm.

9. An X-ray intensifying screen according to claim 1, wherein the weight ratio of phosphor to binder is comprised between 80:20 and 98:2.

10. Use of at least one X-ray intensifying phosphor screen according to claim 1 for imagewise exposure of a light-sensitive photographic material comprising a support bearing on at least one side thereof at least one light-sensitive silver halide emulsion layer containing silver halide grains that are made sensitive to the light emitted by said at least one X-ray intensifying phosphor screen which when activated by X-rays emits fluorescent light predominantly of wavelengths below 410 nm.

11. Use of a pair of X-ray intensifying phosphor screens according to claim 1 having the same or different compositions for imagewise exposure of a silver halide material having on both sides of a support at least one silver halide emulsion layer.

12. A combination of a pair of X-ray intensifying phosphor screens according to claim 1 and a separate light-sensitive photographic material which is located between said screens.

* * * * *